United States Patent
Haka

(10) Patent No.: US 6,926,634 B2
(45) Date of Patent: Aug. 9, 2005

(54) ALL-WHEEL DRIVE TRANSFER CASE WITH DIFFERENT FRONT AND REAR AXLE RATIOS

(75) Inventor: Raymond J. Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 28 days.

(21) Appl. No.: 10/762,404

(22) Filed: Jan. 22, 2004

(65) Prior Publication Data

US 2004/0198544 A1 Oct. 7, 2004

Related U.S. Application Data

(60) Provisional application No. 60/459,666, filed on Apr. 2, 2003.

(51) Int. Cl.[7] .............................................. F16H 37/08
(52) U.S. Cl. ....................... 475/198; 475/204; 475/206; 475/210; 475/213; 475/223; 475/269; 475/295; 475/303; 475/311; 475/330; 180/247; 180/233; 192/53.34; 192/53.35; 192/48.91
(58) Field of Search ................................. 475/198, 210, 475/204, 206, 223, 269, 213, 295, 303, 330, 311; 180/247, 233; 192/53.34, 53.35, 48.91

(56) References Cited

U.S. PATENT DOCUMENTS

| | | | | |
|---|---|---|---|---|
| 4,349,091 A | | 9/1982 | Miyake et al. ............ 192/53 F |
| 5,199,325 A | * | 4/1993 | Reuter et al. ................. 74/335 |
| 5,911,644 A | * | 6/1999 | Williams ..................... 475/295 |
| 6,022,289 A | * | 2/2000 | Francis ....................... 475/320 |
| 6,056,666 A | * | 5/2000 | Williams ..................... 475/320 |
| 6,602,159 B1 | * | 8/2003 | Williams ..................... 475/303 |
| 6,814,682 B2 | * | 11/2004 | Spitale ........................ 475/222 |

* cited by examiner

Primary Examiner—Roger Pang
Assistant Examiner—David D. Le
(74) Attorney, Agent, or Firm—Leslie C. Hodges

(57) ABSTRACT

A transfer case is provided for a vehicle having front and rear axles. The transfer case includes a planetary gear set with first, second and third members. The first member is continuously connected with the front axle and the second member is continuously connected with the rear axle. An input shaft is selectively connectable with the first, second or third member. The transfer case provides rear-wheel drive when the second member is connected with the input shaft, all-wheel drive when the third member is connected with the input shaft, and front-wheel drive when the first member is connected with the input shaft. It is important that the specific members of the planetary gear set be chosen so the absolute value of the torque of the third member is equal to the sum of the absolute value of the torques of the first and second members.

16 Claims, 2 Drawing Sheets

ALL-WHEEL DRIVE TRANSFER CASE WITH DIFFERENT FRONT AND REAR AXLE RATIOS

CROSS-REFERENCE TO RELATED APPLICATION

This application claims the benefit of U.S. Provisional Application No. 60/459,666, filed Apr. 2, 2003, and is hereby incorporated by reference in its entirety.

TECHNICAL FIELD

The present invention relates to an all-wheel drive transfer case incorporating different front and rear axle ratios.

BACKGROUND OF THE INVENTION

Four-wheel drive (4WD) vehicles provide traction which is often unattainable in two-wheel drive (2WD) vehicles by delivering power to both of the vehicle's axles. Attendant with the added traction provided by four-wheel drive is the added complexity of the drive train required to control and deliver power to all four wheels as opposed to only two wheels. Four-wheel drive characteristically does not have a center differential which would maintain a fixed fraction of torque delivered to each axle, but rather maintains the same speed at each axle regardless of the torque split between the two axles. The delivery of power between the front wheels and the rear wheels of the vehicle is typically handled by a transfer case mechanism which usually includes either a mechanically- or electronically-controlled clutch to switch between rear-wheel drive and four-wheel drive.

In all-wheel drive (AWD) systems, the front and rear axles are continually in driving engagement with the transfer case, but the system contains a center differential to maintain a fixed ratio of torque between the front and rear axle.

In addition to controlling the transfer of torque between front and rear axles of a vehicle, the transfer case may also include a planetary gear set or set of countershaft gears which provides an underdrive or overdrive ratio. Further, rather than manufacturing a new five- or six-speed transmission, an existing four-speed transmission may be used with a multi-speed transfer case to provide additional speed ratios, such as for stump pulling (extreme underdrive), or in a top gear-overdrive condition.

All-wheel drive transfer cases typically contain a planetary gear set to provide the center differential function that maintains a constant torque split between the front and rear axle independent of tire speed or slip. The vehicle is also typically equipped with identical front and rear axle ratios and identical front and rear tire rolling radii in order to minimize the power (torque related losses) circulated in the center differential. The typical all-wheel drive transfer case only provides a direct or 1:1 torque ratio to the axles, and does not contain any ratio changing clutches because there is only one mode of operation. Some all-wheel drive transfer cases provide a friction clutch across the center differential to dynamically change the front to rear torque ratio.

SUMMARY OF THE INVENTION

The present invention provides a low cost transfer case which provides three distinct final drive ratios with a simple or compound planetary gear set and one, two or three dog clutches.

More specifically, the invention provides a transfer case for a vehicle having front and rear axles. The transfer case includes a planetary gear set with first, second and third members. The first member is continuously connected with the front axle, and the second member is continuously connected with the rear axle. An input shaft is selectively connectable with the first, second or third member. The transfer case provides rear-wheel drive when the second member is connected with the input shaft, all-wheel drive when the third member is connected with the input shaft, and front-wheel drive when the first member is connected with the input shaft. It is important to select the ring, carrier, and sun members of the planetary gear set so the absolute value of the torque of the third member is equal to the sum of the absolute values of the torques of the first and second members.

When the planetary gear set is a simple planetary gear set, the first member can be either the ring gear or the sun gear, the second member will be the sun gear or ring, whichever was not used as the first member, and the third member must be the carrier. The connections of the sun gear and ring gear to the front and rear axles may be interchanged to provide a different torque split between the two axles.

The front axle ratio is different from the rear axle ratio.

When the planetary gear set is a compound planetary gear set, the first member is either the carrier or the sun gear, the second member is the sun gear or carrier, whichever was not used as the first member, and the third member must be the ring gear. The connections of the carrier and sun gear to the front and rear axles may be interchanged to provide a different torque split between the two axles.

The input shaft connections may be provided by a three-way dog clutch, a single and two-way dog clutch, or three single dog clutches.

In all-wheel drive, with a simple planetary gear set, the input is to the carrier, and with a compound planetary gear set, the input is to the ring gear. Accordingly, for a simple planetary gear set, the absolute value of the torque of the carrier is equal to the sum of the absolute values of the torques of the sun gear and ring gear. For a compound planetary gear set, the absolute value of the torque of the ring gear is equal to the sum of the absolute values of the torques of the carrier and sun gear. In other words, in a lever diagram representing the respective planetary gear set, the third member is always positioned between the first and second members.

The invention also provides a drive train for a vehicle including front and rear axles having different axle ratios, and a transfer case. The transfer case includes a planetary gear set with first, second and third members. The first member is continuously connected with the front axle, and the second member is continuously connected with the rear axle. An input shaft is selectively connectable with the first, second or third member. The transfer case provides rear-wheel drive when the second member is connected with the input shaft, all-wheel drive when the third member is connected with the input shaft, and front-wheel drive when the first member is connected with the input shaft.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
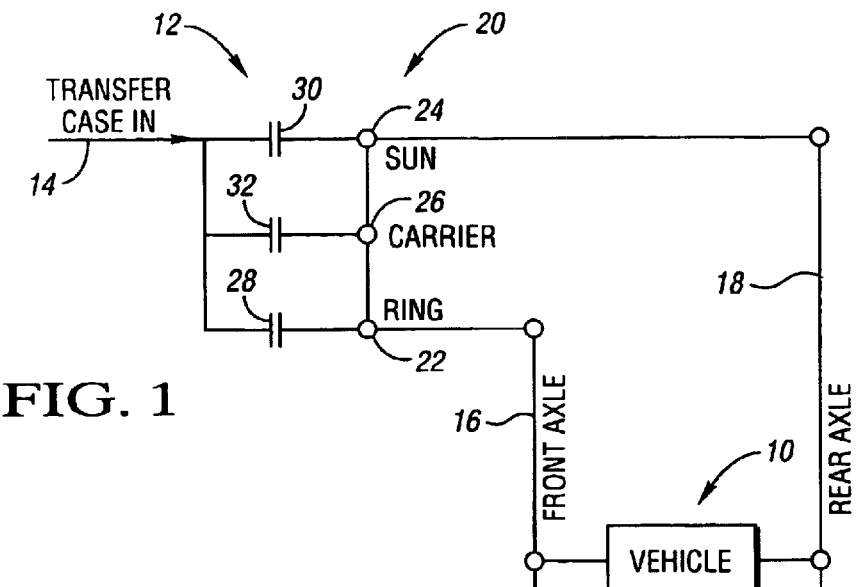
FIG. 1 shows a lever diagram of a transfer case on a vehicle in accordance with the invention.

Referring to FIG. 1, a lever diagram is shown illustrating a vehicle 10 incorporating a transfer case 12 for receiving torque from an input 14 and distributing the torque between the front and rear axles 16, 18 of the vehicle 10. Preferably, the front and rear axles have different axle ratios. The "axle ratio" is the relationship between the vehicle's drive shaft (or propeller shaft) and its wheel axle. For instance, a 4:1 or 4.0 axle ratio means that the drive shaft turns four times for every one time the axle turns. The higher the axle ratio, the greater force that can be applied to the drive wheels for tasks like towing up a grade or pulling a boat out of the water. With the present invention, for example, the front axle may have a ratio of 3.42 and the rear axle may have a ratio of 4.10. However, the invention described herein would also be applicable to a vehicle having identical front and rear axle ratios. The transfer case 12 includes the planetary gear set 20 which is a simple planetary gear set including first, second and third members. The first member is the ring gear 22, the second member is the sun gear 24, and the third member is the carrier 26.

The ring gear 22, sun gear 24 and carrier 26 are selectively connectable with the input 14 via the clutches 28, 30, 32, respectively. The clutches 28, 30, 32 may be embodied as a single three-way dog clutch, three single dog clutches, or a single dog clutch and a dual dog clutch. Sample dog clutches for use with the present invention are shown, for example, in U.S. Pat. No. 4,349,091 which is hereby incorporated by reference in its entirety.

When the clutch 30 is engaged, the input 14 is connected to the sun gear 24 to the rear axle 18 to provide a rear-wheel drive—low mode. When the clutch 28 is engaged, the input 14 is connected through the ring gear 22 to the front axle 16 to provide a front-wheel drive—high mode of operation. When the clutch 32 is engaged, the input 14 is connected to the carrier 26 and the vehicle is in an all-wheel drive mode in which torque is split between the front and rear axles 16, 18.

Accordingly, the invention provides three effective axle ratios with only a center planetary gear set differential and one, two or three dog clutches.

The ring gear to sun gear tooth ratio of the planetary gear set combined with the axle ratios will determine the front to rear torque split and the effective all-wheel drive axle ratio, as defined in the following formulas:

$$\frac{\text{Fraction of Torque}}{\text{on the front axle}} = \frac{(\text{Ring}/(\text{Ring}+\text{Sun}))\times \text{Front axle ratio}\times \text{Chain Ratio}}{(\text{Ring}/(\text{Ring}+\text{Sun}))\times \text{Front axle ratio}\times \text{Chain Ratio}+(\text{Sun}/(\text{Ring}+\text{Sun}))\times \text{Rear axle ratio}}$$

Effective AWD axle ratio=(Ring/(Ring+Sun))×Front axle ratio× Chain ratio+(Sun/(Ring+Sun))×Rear axle ratio In the above formulas, the terms "ring" and "sun" refer to the tooth counts of the ring gear and sun gear. It should be obvious to those skilled in the art, that the tire rolling radius can also be used to change the effective axle ratio, front to rear.

Figure 2:
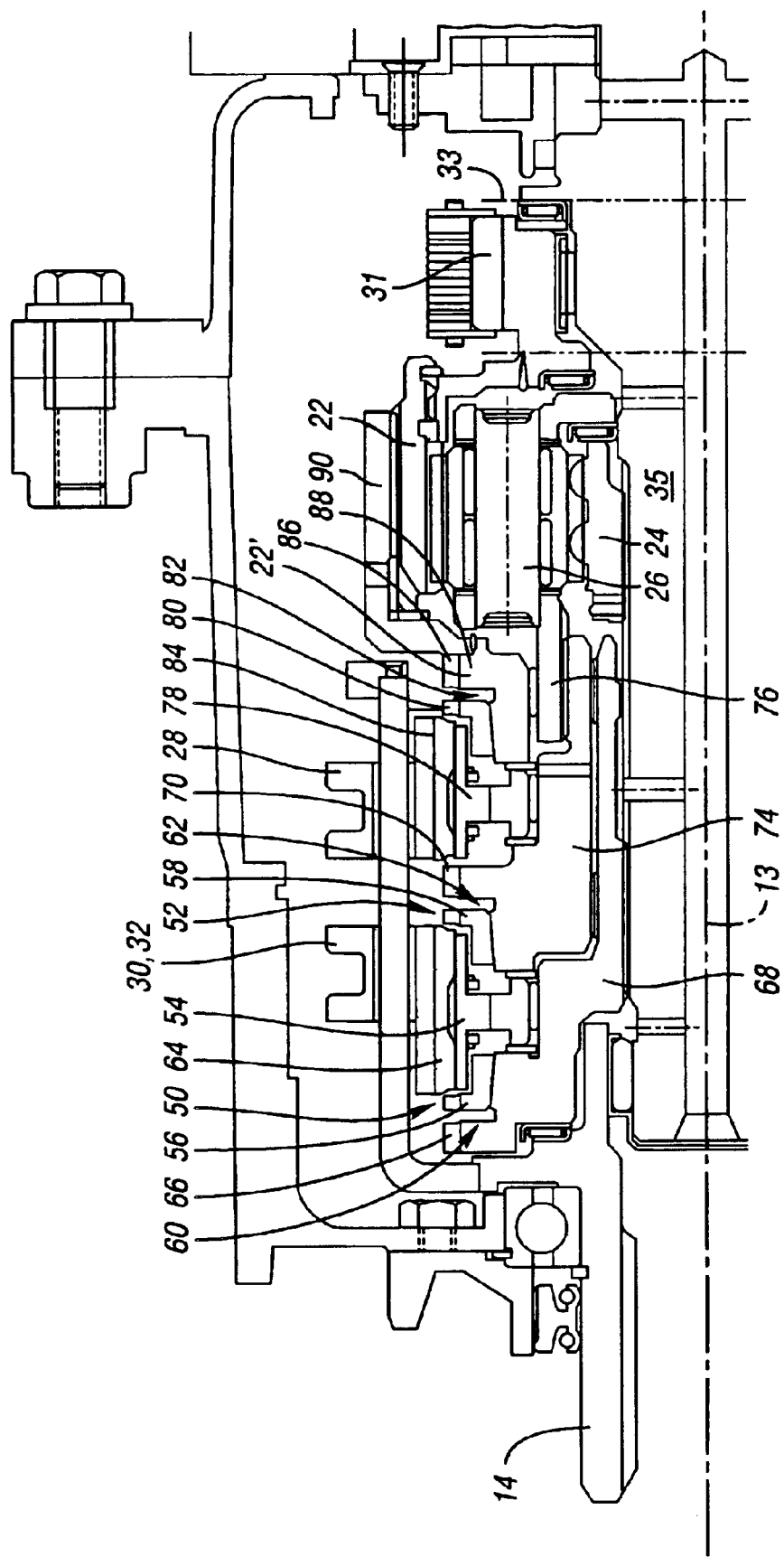
FIG. 2 shows a partial longitudinal cross-sectional view of a transfer case in accordance with the invention.

Referring to FIG. 2, a partial longitudinal cross-sectional view of the transfer case 12 is shown having a center line 13 about which the components rotate. As illustrated, the input shaft 14 is selectively connectable with the sun gear 24 or the carrier 26 via the two-way dog clutch 30, 32. The two-way dog clutch includes synchronizers 50, 52, having a male spline member 54, blocker rings 56, 58, and cone clutches 60, 62.

The splines of the sleeve 64 of the dog clutch 30, 32 are engageable with the teeth 66 of the hub member 68, which is connected with the sun gear 24, when the dog clutch 30, 32 is moved to the left as viewed in FIG. 2. The sun gear 24 is splined to the shaft 35, which is connected to the rear axle. Alternatively, the splines of the sleeve 64 of the dog clutch 30, 32 are engageable with the teeth 70, which are connected with the carrier 26 through the component 74, when the dog clutch 30, 32 is moved to the right as viewed in FIG. 2.

The single dog clutch 28 may be engaged to selectively connect the ring gear 22 with the input shaft 14. The dog clutch 28 includes a male spline member 78, a blocker ring 80, and a cone clutch 82. The splines of the sleeve 84 are engageable with the teeth 86 of the member, which is connected to the ring gear 22 through the component 90. Accordingly, when the dog clutch is moved to the right as viewed in FIG. 2, the input shaft 14 may be engaged with the ring gear 22. The ring gear 22 is fixed to the sprocket 31 which transfers torque to the front axle via the transfer chain 33. The transfer case 12 also includes the case housing 39.

The arrangement of front-wheel drive high and rear wheel drive low is ideal for a passenger truck. In two-wheel drive, the transfer case will place the vehicle in front-wheel drive for the economy ratio, and rear-wheel drive for the "tow haul" or performance ratio. An unloaded pickup truck will have the majority of the vehicle weight on the front wheels, and achieve maximum fuel economy with maximum traction in the front-wheel drive high mode. Fully loaded, the same pickup truck will have the majority of the vehicle weight on the rear wheels and need the improved performance of the rear-wheel drive low mode. The all-wheel drive mode will be required for low coefficient of friction surfaces (mud or snow) where the tractive effort will be limited by the low coefficient of friction, not the axle ratio or front to rear torque split.

The system does have an additional loss mechanism (relative to a conventional all-wheel drive system with identical axle ratios) in that the center differential now has power (torque and speed) cycling through it even when the front and rear axles spin at the same speed. This would cause a small amount of torque related losses in the planetary gear set when driving in the all-wheel drive mode. The magnitude of these losses are in the range of 0.1% to 0.2% when using a rear axle ratio 1.3 times the front axle torque ratio with a 2:1 ring gear to sun gear ratio simple planetary center differential.

This kinematic arrangement will work well with dog clutches due to the high level of torque going into the transfer case. If it is desirable to use friction clutches, the low-high shift could be made dynamically, but there would be considerable expense making the clutches large enough to carry the transfer case input torque. There would also be a disadvantage of increased spin losses of the open clutches.

The main advantage of this arrangement is reduced cost. A three speed transfer case is achieved with a single (low torque capacity) simple planetary gear set and a three-way dog clutch. The arrangement takes advantage of the fact that an all-wheel drive vehicle needs a front and rear axle ratio, and simply specifies that the front axle ratio times the chain ratio and the rear axle ratio be the extreme of the desired high and low ratios, rather than providing two identical axle ratios and obtaining the two additional ratios (direct, extra ratio 1, and extra ratio 2) in the transfer case.

The arrangement may alternatively be executed with the front axle connected to the sun gear, in which case the above equations related to torque split and effective all-wheel drive axle ratio can still be used, but it is necessary to exchange the sun gear tooth count for the ring gear tooth count. The arrangement can also be executed with a compound planetary gear set if it is necessary to obtain a ring gear to sun gear ratio less than 1.5:1. In this situation, the front and rear axles can be connected to either the sun gear or carrier, and the all-wheel drive input must be connected to the ring gear. When the rear axle is connected to the sun gear, the equations governing the torque split and net all-wheel drive axle ratio are as follows:

$$\text{Fraction of Torque on the front axle} = \frac{((\text{Ring} - \text{Sun})/\text{Ring}) \times \text{Front axle ratio} \times \text{Chain Ratio}}{((\text{Ring} - \text{Sun})/\text{Ring}) \times \text{Front axle ratio} \times \text{Chain Ratio} + (\text{Sun}/\text{Ring}) \times \text{Rear axle ratio}}$$

$$\text{Effective AWD axle ratio} = (\text{Ring} - \text{Sun})/\text{Ring}) \times \text{Front axle ratio} \times \text{Chain ratio} + (\text{Sun}/\text{Ring}) \times \text{Rear axle ratio}$$

In the above equations, the terms "ring" and "sun" refer to the ring gear tooth count and sun gear tooth count. Note the effective all-wheel drive axle ratio is always between the front and rear axle ratios.

Figure 3:
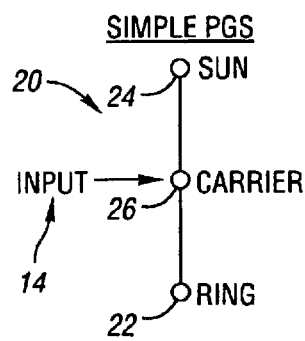
FIG. 3 shows a lever diagram of a simple planetary gear set corresponding with FIG. 1.
Figure 4:
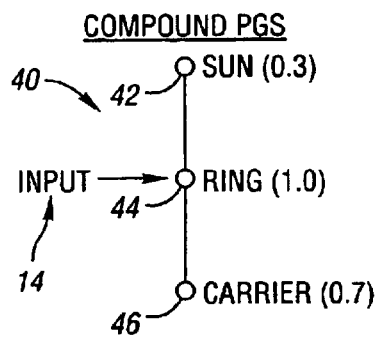
FIG. 4 shows a compound planetary gear set for use in the transfer case of FIG. 1 in accordance with an alternative embodiment of the invention.

FIG. 3 illustrates a lever diagram of the planetary gear set 20 of FIG. 1 wherein the input 14 is connected to the carrier 26 in all-wheel drive mode. FIG. 4 shows a lever diagram of a compound planetary gear set 40 including a carrier 42, ring gear 44, and sun gear 46. Compound planetary gear set 40 of FIG. 3 may replace the simple planetary gear set 20 in the embodiment of FIG. 1. As illustrated in FIG. 4, in all-wheel drive mode, the input 14 is connected to the ring gear 44. In the simple planetary gear set of FIG. 3, the sun gear and ring gear are interchangeable, and in the compound planetary gear set of FIG. 4, the carrier 42 and sun gear 46 connections to the front and rear axles are interchangeable. The commonality between these planetary gear sets is that in the all-wheel drive mode, the input is connected to the middle member on the lever diagram. In the simple planetary gear set of FIG. 3, the input 14 goes to the carrier 26, which is between the sun gear 24 and ring gear 22. Similarly, in the compound planetary gear set 40 of FIG. 4, in the all-wheel drive mode, the input 14 is connected to the ring gear 44, which is between the carrier 42 and the sun gear 46 in the lever diagram as shown.

Another way of defining this commonality between the simple and compound planetary gear sets is that in the all-wheel drive mode, the absolute value of the torque of the third member is equal to the sum of the absolute values of the torques of the first and second members. Accordingly, in the simple planetary gear set of FIG. 3, the absolute value of the torque of the carrier 26 (the third member) is equal to the absolute value of the torque of the sun gear 24 (the second member) plus the absolute value of the torque of the ring gear 22 (the first member). Similarly, the compound planetary gear set of FIG. 4, in the all-wheel drive mode, the absolute value of the torque of the ring gear 44 (the third member) equals the absolute value of the torque of the carrier 42 (the second member) plus the absolute value of the torque of the sun gear 46 (the first member). For example, if the torque of the ring gear 44 is 1.0 and the torque of the sun gear 46 is 0.7, then the torque of the carrier 42 must be 0.3, as illustrated in FIG. 4. The representative formula is as follows:

$$|T_{3rd}| = |T_{1st}| + |T_{2nd}|$$

In the above formula $|T_{3rd}|$ is the absolute value of the torque of the third member, $|T_{1st}|$ is the absolute value of the torque of the first member, and $|T_{2nd}|$ is the absolute value of the torque of the second member.

Figure 5:
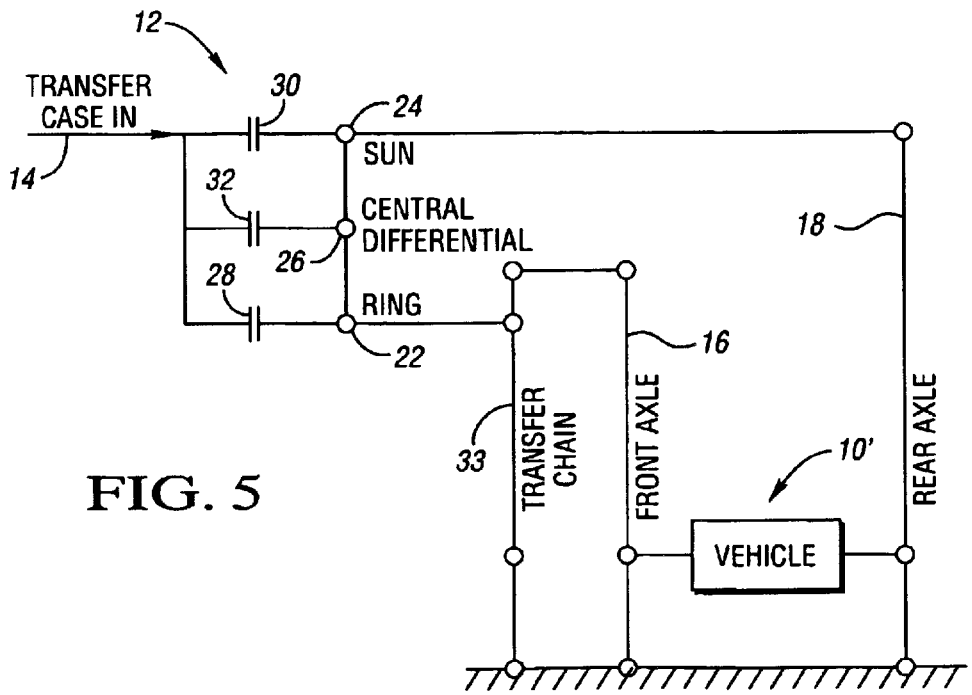
FIG. 5 shows a lever diagram of a transfer case corresponding with FIG. 2.

FIG. 5 illustrates a lever diagram of a vehicle 10' similar to that of FIG. 1, wherein like reference numbers refer to like components from FIG. 1. However, FIG. 5 adds the transfer chain 33 (also shown in FIG. 2) connected between the ring gear 22 and the front axle 16. The transfer chain 33 alters the overall front ratio, which is a combination of the chain ratio and the front axle ratio.

While the best modes for carrying out the invention have been described in detail, those familiar with the art to which this invention relates will recognize various alternative designs and embodiments for practicing the invention within the scope of the appended claims.

What is claimed is:

1. A transfer case for a vehicle having front and rear axles, comprising:

a planetary gear set including first, second and third members;

said first member being continuously connected with the front axle;

said second member being continuously connected with the rear axle;

an input shaft selectively connectable with said first, second or third members; and said transfer case providing rear wheel drive when the second member is connected with the input shaft, all-wheel drive when the third member is connected with the input shaft, and front wheel drive when the first member is connected with the input shaft;

wherein, in all-wheel drive, the absolute value of the torque of the third member is equal to the sum of the absolute values of the torques of the first and second members.

2. The transfer case of claim 1, wherein said planetary gear set comprises a simple planetary gear set, said first member being a ring gear, said second member being a sun gear, and said third member being a carrier.

3. The transfer case of claim 1, wherein said planetary gear set comprises a compound planetary gear set, said first member being a sun gear, said second member being a carrier, and said third member being a ring gear.

4. The transfer case of claim 1, wherein a front ratio of the front axle is different from a rear axle ratio of the rear axle.

5. The transfer case of claim 1, further comprising a plurality of dog clutches and synchronizers for selectively engaging said input shaft with said first, second or third members.

6. The transfer case of claim 5, wherein one of said plurality of dog clutches is a two-way dog clutch.

7. The transfer case of claim 1, further comprising a transfer chain connected between the front axle and said first member.

8. The transfer case of claim 7, wherein a front axle ratio of the front axle times a chain ratio of said transfer chain is different from a rear axle ratio of the rear axle.

9. A drive train for a vehicle, comprising:

front and rear axles; and a transfer case including:
- a planetary gear set including a sun gear, carrier and ring gear;
- said ring gear being continuously connected to the front axle;
- said sun gear being continuously connected to the rear axle;
- an input shaft selectively connectable with said sun gear, carrier or ring gear; and
- said transfer case providing rear wheel drive low when the sun gear is engaged with the input shaft, all-wheel drive when the carrier is engaged with the input shaft, and front wheel drive high when the ring gear is engaged with the input shaft.

10. The drive train of claim 9, wherein said planetary gear set comprises a simple planetary gear set.

11. The drive train of claim 9, wherein a front axle ratio of the front axle is different from a rear axle ratio of the rear axle.

12. The drive train of claim 9, further comprising a plurality of dog clutches and synchronizers for selectively engaging said input shaft with said sun gear, ring gear or carrier.

13. The drive train of claim 12, wherein one of said plurality of dog clutches is a two-way dog clutch.

14. The drive train of claim 9, further comprising a transfer chain connected between the front axle and said ring gear.

15. The drive train of claim 14, wherein a front axle ratio of the front axle times a chain ratio of said transfer chain is different from a rear axle ratio of the rear axle.

16. A drive train for a vehicle, comprising:

front and rear axles having different axle ratios; and a transfer case including:
- a planetary gear set including a sun gear, carrier and ring gear;
- said ring gear being continuously connected to the front axle;
- said sun gear being continuously connected to the rear axle;
- an input shaft selectively connectable with said sun gear, carrier or ring gear;
- a plurality of dog clutches and synchronizers for selectively engaging said input shaft with said sun gear, ring gear or carrier; and
- said transfer case providing rear wheel drive low when the sun gear is engaged with the input shaft, all-wheel drive when the carrier is engaged with the input shaft, and front wheel drive high when the ring gear is engaged with the input shaft;
- wherein said planetary gear set comprises a simple planetary gear set.

* * * * *